(12) United States Patent
Lin

(10) Patent No.: US 10,265,893 B2
(45) Date of Patent: Apr. 23, 2019

(54) AUTOMATIC NUT-INSERTED INJECTION MOLDING SYSTEM AND METHOD OF THE SAME

(71) Applicant: Quanta Computer Inc., Taoyuan (TW)

(72) Inventor: Shu-Chen Lin, Taoyuan (TW)

(73) Assignee: Quanta Computer Inc., Taoyuan (TW)

( * ) Notice: Subject to any disclaimer, the term of this patent is extended or adjusted under 35 U.S.C. 154(b) by 754 days.

(21) Appl. No.: 14/845,261

(22) Filed: Sep. 3, 2015

(65) Prior Publication Data

US 2016/0361851 A1 Dec. 15, 2016

(30) Foreign Application Priority Data

Jun. 12, 2015 (TW) .............................. 104119131 A

(51) Int. Cl.
*B29C 45/14* (2006.01)
*B29L 1/00* (2006.01)

(52) U.S. Cl.
CPC .. *B29C 45/14008* (2013.01); *B29C 45/14065* (2013.01); *B29C 2045/14155* (2013.01); *B29L 2001/005* (2013.01)

(58) Field of Classification Search
CPC ........ B29C 45/14008; B29C 45/14065; B29C 2945/14155
See application file for complete search history.

(56) References Cited

U.S. PATENT DOCUMENTS 3,293,693 A * 12/1966 Ohl .................. B29C 45/14065
264/267

FOREIGN PATENT DOCUMENTS

CN 202480314 U 10/2012

* cited by examiner

*Primary Examiner* — Christina A Johnson
*Assistant Examiner* — Xue H Liu
(74) *Attorney, Agent, or Firm* — Rabin & Berdo, P.C.

(57) ABSTRACT

An automatic nut-inserted injection molding system and a method of the same are provided, and the system includes an automatic feeding machine for providing a nut, an air-evacuating device, a robot arm for delivering the nut, and an injection-molding module. The injection-molding module includes a first mold block, a second mold block, an air passage and an air needle. The second mold block is detachably closed with the first mold block for mutually defining a molding cavity. The air needle is partially embedded in the second mold block. The air passage is formed in the second mold block, and respectively connected to the air needle and the air evacuation device.

6 Claims, 7 Drawing Sheets

AUTOMATIC NUT-INSERTED INJECTION MOLDING SYSTEM AND METHOD OF THE SAME

RELATED APPLICATIONS

This application claims priority to Taiwan Application Serial Number 104119131, filed Jun. 12, 2015, which is herein incorporated by reference.

BACKGROUND

Field of Disclosure

The present disclosure relates to an injection molding system and a method of the same. More particularly, the present disclosure relates to an automatic nut-inserted injection molding system and a method of the same.

Description of Related Art

In a plastic shell, a plurality of nuts are normally inserted thereon to enhance coupling force of screws and avoid stripped thread of the detached screws, so that assembly parts (e.g., circuited board) can be firmly secured on the nuts of the plastic shell. A traditional process for making the plastic shell having the nuts inserted thereon is, after the formation of the plastic shell, to heat and then press the nuts into the plastic shell, which requires a melting equipment.

In the process of pressing the heated nuts into the plastic shell after the plastic shell is formed, an additional nut-pressing equipment is required for pressing nuts on the plastic shell. In this regard, the process of pressing the nuts into the plastic shell not only takes time, labor and cost so to be a burden of the production, but also fails to satisfy consistent automation process requirements from injection molding to nut-inserting process.

Therefore, how to provide a solution to effectively solve the aforementioned inconvenience and shortages and to increase the competitiveness of industries is urgent in the industries.

SUMMARY

One aspect of the present disclosure is to provide an automatic nut-inserted injection molding system to overcome the defects and inconvenience of the prior art.

For achieving the aforementioned objection, according to one embodiment, the automatic nut-inserted injection molding system includes an automatic feeding machine for providing a nut, a robot arm for delivering the nut, an air-evacuating device and an injection-molding module. The injection-molding module includes a first mold block, a second mold block, an air passage and an air needle. The second mold block is detachably closed with the first mold block for mutually defining a molding cavity. One part of the air needle is partially embedded in the second mold block, and the other part of the air needle is exposed outwardly from a surface of the second mold block. The air passage is formed in the second mold block, and respectively connected to the air needle and the air evacuation device.

When the robot arm delivers the nut onto the air needle, so that the air needle inserts into the enclosed nut bore of the nut, the air-evacuating device is activated for drawing air away from the air passage. As the air passage is almost in a vacuum state, the atmospheric pressure in the air passage tightly sucks the nut on an end surface of the second mold block. Thus, as the air-evacuating device draws air of the air passage to generate vacuum attraction, not only the nut can be fixed in the injection-molding module, but also the enclosed nut bore of the nut can be hermetically isolated from the molding cavity so as to avoid resin material in the molding cavity flowing into the enclosed nut bore of the nut.

Another aspect of the present disclosure is to provide a method of automatic nut-inserted injection molding includes steps outlined below.

A first mold block and a second mold block are separated. At least one nut is fed by an automatic feeding machine. The nut is delivered to an air needle extending from the second mold block by a robot arm so that the air needle inserts into an enclosed nut bore of the nut. Air from the enclosed nut bore is drawn away via the air needle by an automatic feeding machine so that the enclosed nut bore is tightly sucked on the air needle when vacuum attraction is generated in the enclosed nut bore. The first mold block and the second mold block are closed to mutually define a molding cavity, so that the enclosed nut bore is hermetically isolated from the molding cavity. Resin material is fully injected into the molding cavity so that the resin material wraps the nut to form a plastic shell with the nut embedded therein.

Thus, by using the method of automatic nut-inserted injection molding of the disclosure, not only the whole process thereof can be reduced and simplified, but also the step of thermally pressing the heated nuts into the plastic shell can be omitted, and additional time, labor and cost do not required so as to decrease manufacturing cost.

It is to be understood that both the foregoing general description and the following detailed description are by examples, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

DESCRIPTION OF THE EMBODIMENTS

Figure 1:
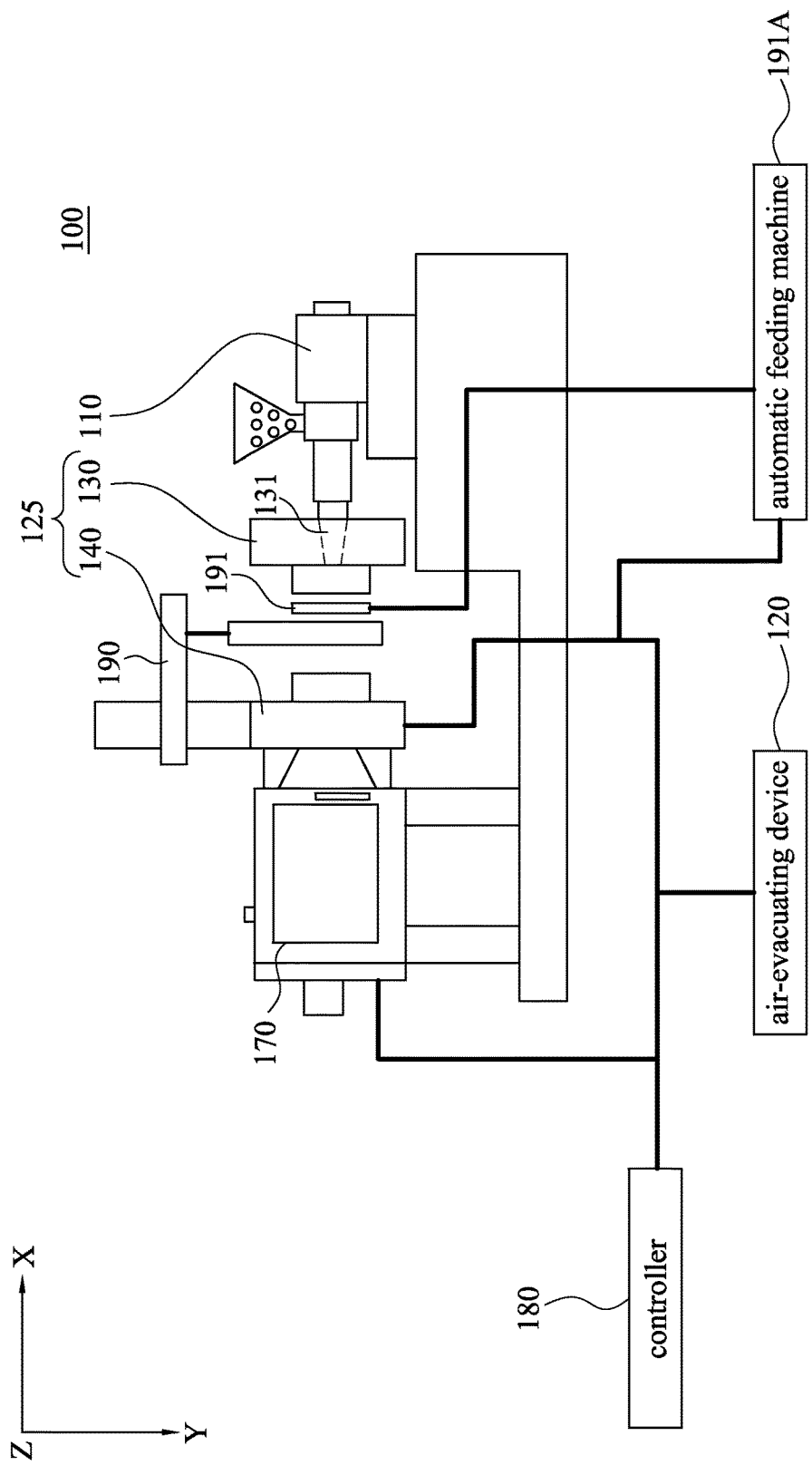
FIG. 1 is a schematic view of an automatic nut-inserted injection molding system according to an embodiment of this disclosure.

Reference will now be made in detail to the present embodiments of the disclosure, examples of which are illustrated in the accompanying drawings. Wherever possible, the same reference numbers are used in the drawings and the description to refer to the same or like parts.

According to the embodiments, it will be apparent to those skilled in the art that various modifications and variations can be made to the structure of the present disclosure without departing from the scope or spirit of the disclosure.

Figure 2:
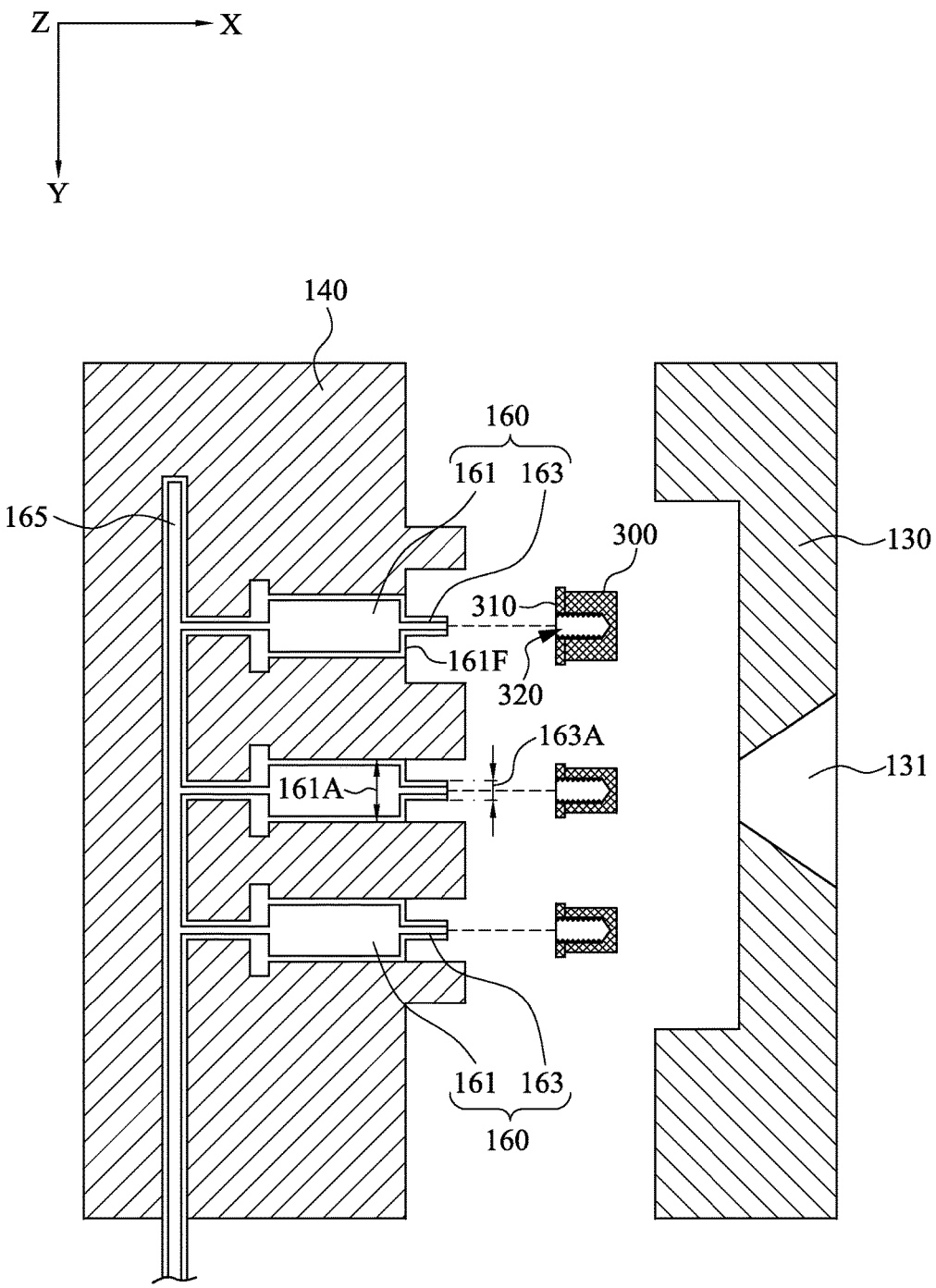
FIG. 2 is a schematic view of the first mold block and the second mold block of FIG. 1 in a mold-opening status.
Figure 3:
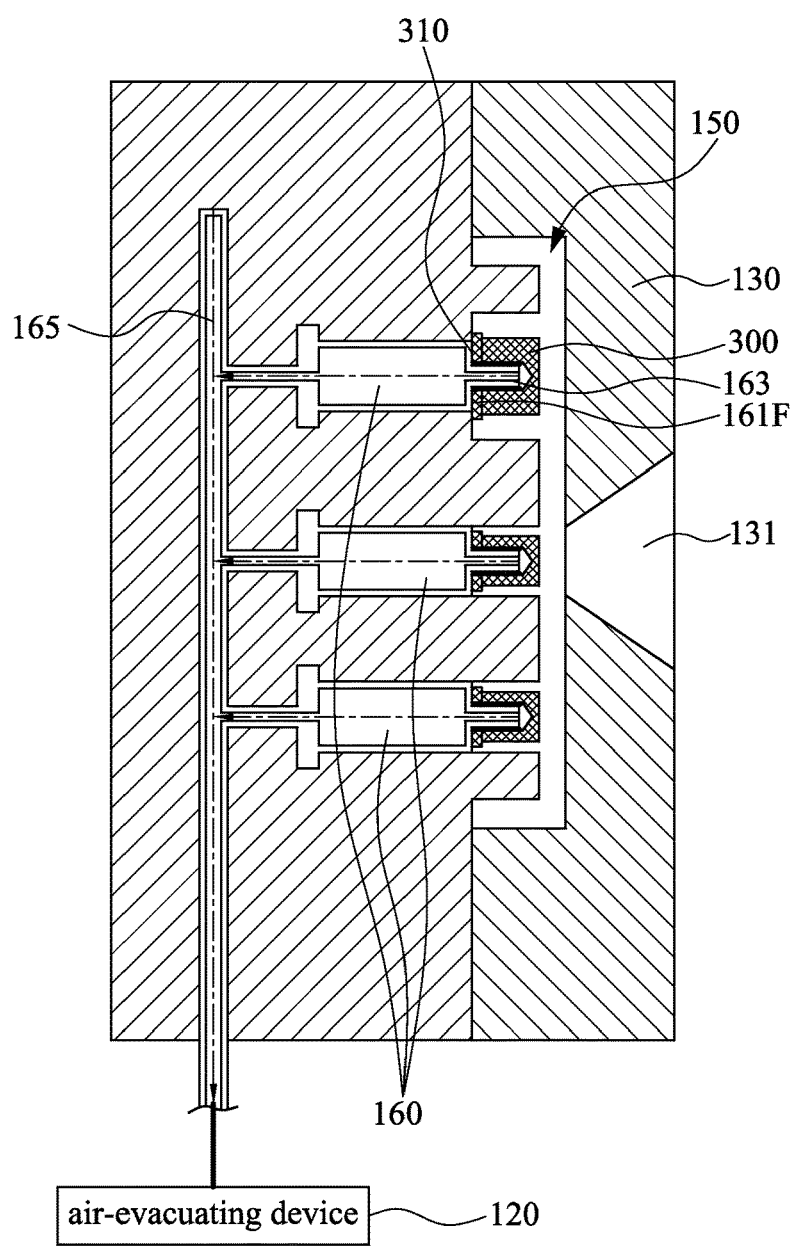
FIG. 3 is a schematic view of the first mold block and the second mold block of FIG. 1 in a mold-closing status.

Reference is now made to FIG. 1 to FIG. 3 in which FIG. 1 is a schematic view of an automatic nut-inserted injection molding system 100 according to an embodiment of this disclosure, FIG. 2 is a schematic view of the first mold block 130 and the second mold block 140 of FIG. 1 in a mold-opening status, and FIG. 3 is a schematic view of the first mold block 130 and the second mold block 140 of FIG. 1 in a mold-closing status. As shown in FIG. 1 to FIG. 3, the automatic nut-inserted injection molding system 100 of the embodiment is used to form a plastic shell with the nuts 300 embedded therein. Each of the nuts 300 is formed with an enclosed nut bore (or called blind hole or blind screw hole) 320 at one end surface thereof, the enclosed nut bore 320 is allowed to combine with a needle valve 163 for mutually forming a closed structure (will be described herein after). The enclosed nut bore 320 enables assembly parts to securely attach on the plastic shell. The automatic nut-inserted injection molding system 100 includes an injection molding mechanism 110, an air-evacuating device 120 and an injection-molding module 125.

The injection-molding module 125 includes a first mold block 130, a second mold block 140, at least one air needle 160 (e.g., three air needles) and at least one air passage 165 (e.g., one air passage). Each of the air needles 160 has one part embedded in the second mold block 140, and the other part, which is provided with a needle valve 163, is exposed outwards from a surface of the second mold block 140 facing towards the first mold block 130 so that the needle valve 163 inserts into the enclosed nut bore 320 of the nut 300 to form the closed structure. The air passage 165 is formed (e.g., embedded) in the second mold block 140. One end of the air passage 165 is connected to the air needle 160, and the other end of the air passage 165 is connected to the air evacuation device 120 via connecting pipes. The second mold block 140 can be detachably closed with the first mold block 130, and a molding cavity 150 can be therefore mutually defined between the second mold block 140 and the first mold block 130 after the second mold block 140 is closed with the first mold block 130. The injection molding mechanism 110 injects resin material into the molding cavity 150 through a runner 131 in the first mold block 130.

When the air needle 160 inserts into the enclosed nut bore 320 of the nut 300, or even not insert into the enclosed nut bore 320 yet, the air evacuation device 120 is activated to draw air away from the air passage 165. As the air passage 165 is almost in a vacuum state, the atmospheric pressure in the air passage 165 and the air needle 160 tightly sucks the nut 300 on an end surface of the second mold block 140 so that the enclosed nut bore 320 is hermetically isolated from the molding cavity 150 so as to avoid resin material flowing into the enclosed nut bore 320.

In one preferred embodiment, as shown in FIG. 2, the first mold block 130 and the second mold block 140 are closed together along a mold-closed axis (i.e., X axis), the air needles 160 are arranged abreast on the second mold block 140. A major axis (i.e., X axis) of each of the air needles 160 is in parallel with the mold-closed axis, and is perpendicular to a major axis of the air passage 165 (i.e., Y axis).

However, the disclosure is not limited to the installation directions of the air needles and the air passage, in other embodiments, the major axis of each of the air needles also can be intersected with the mold-closed axis of the first mold block and the second mold block closing together.

In greater details, the air needle 160 includes a pipe body 161 and a needle valve 163, and an internal diameter 161A of the pipe body 161 is greater than an internal diameter 163A of the needle valve 163. One end of the pipe body 161 is communicated with the air passage 165 in the second mold block 140, and the needle valve 163 is connected to an end surface 161F of the other end of the pipe body 161 for inserting into the enclosed nut bore 320 of the nuts 300 (FIG. 3). Thus, when the air evacuation device 120 draws air away from the air passage 165 so that the air passage 165 is almost in a vacuum state, the atmospheric pressure in the air passage 165 and the air needle 160 tightly sucks the nut 300 on the end surface 161F of the pipe body 161.

As shown in FIG. 1, in the embodiment, the automatic nut-inserted injection molding system 100 includes a mold-clamping mechanism 170, a controller 180, a first robot arm 191, a second robot arm 190 and an automatic feeding machine 191A. The second mold block 140 is connected to the mold-clamping mechanism 170, and the second mold block 140 is moved by the mold-clamping mechanism 170 along the X-axis direction for engaging with the first mold block 130 as in the mold-closing status, or leaving away from the first mold block 130 as in the mold-opening status. The automatic feeding machine 191A automatically feeds the nuts 300. The first robot arm 191 delivers the nuts 300 from the automatic feeding machine 191A to the surface of the second mold block 140 along the Z-axis direction. The controller 180 is electrically connected to the air evacuation device 120, the automatic feeding machine 191A and the mold-clamping mechanism 170, and outputs signals to activate the automatic feeding machine 191A, the air evacuation device 120 and the mold-clamping mechanism 170 for performing the operations described above. After the automatic feeding machine 191A receives the signals, the automatic feeding machine 191A immediately feeds the nuts 300 so that the first robot arm 191 may deliver the nuts 300 to the air needle 160. After the air evacuation device 120 receives the signals, the air evacuation device 120 immediately draws the air away from the air passage 165 to transform the air passage 165 in the vacuum state for sucking the nuts 300 with the atmospheric pressure of the air passage 165, then, the first robot arm 191 is moved away. After that, steps of mold-closing, material-injection, packing, cooling, mold-opening and product-ejection are performed sequentially in which the second robot arm 190 descends downwards along the Y-axis direction, and then removes the plastic shell away the second mold block 140 along the X-axis direction in the product-ejection step.

Figure 4:
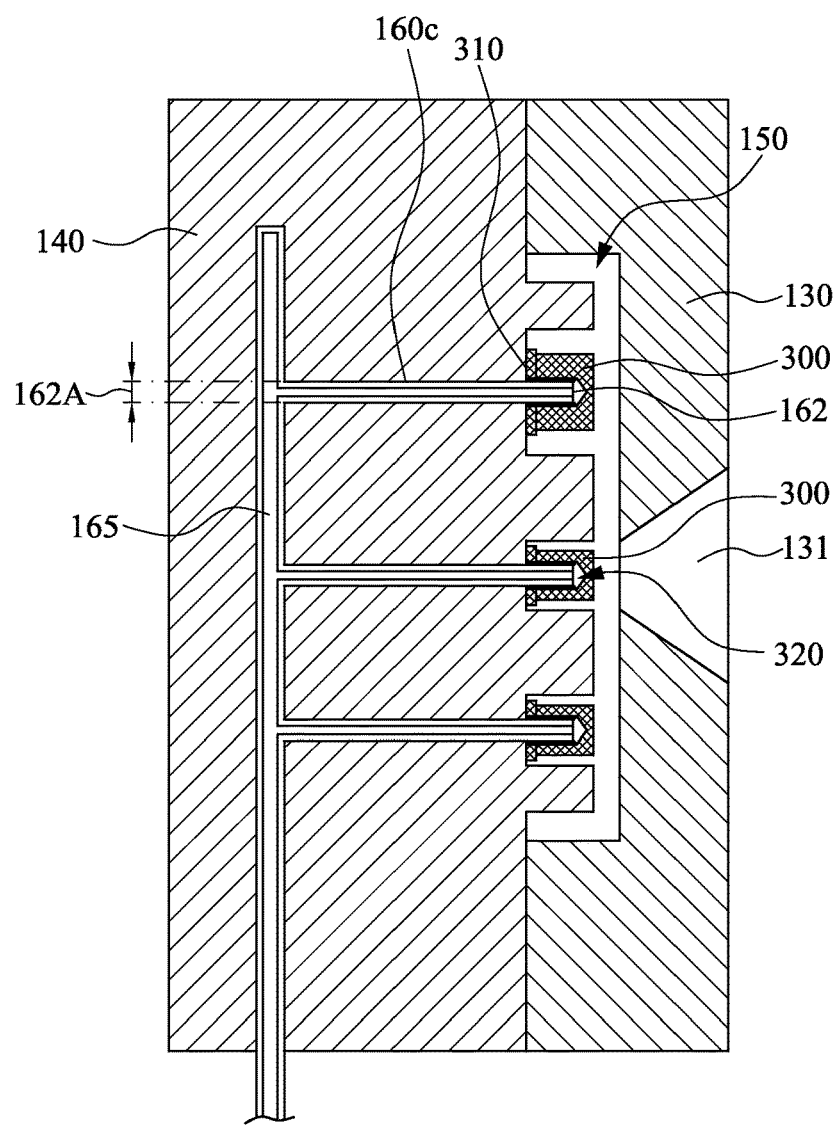
FIG. 4 is a schematic view of an air needle of the automatic nut-inserted injection molding system according to another embodiment of this disclosure.

FIG. 4 is a schematic view of an air needle 160c of the automatic nut-inserted injection molding system 101 according to another embodiment of this disclosure. As shown in FIG. 4, in this embodiment, the air needle 160c includes a pipe body 162 with a single-caliber 162A. One end of the pipe body 162 is communicated with the air passage 165 in the second mold block 140, and the other end of the pipe body 162 projects outwards from the surface of the second mold block 140 for inserting into the enclosed nut bore 320 of the nut 300.

Figure 5:
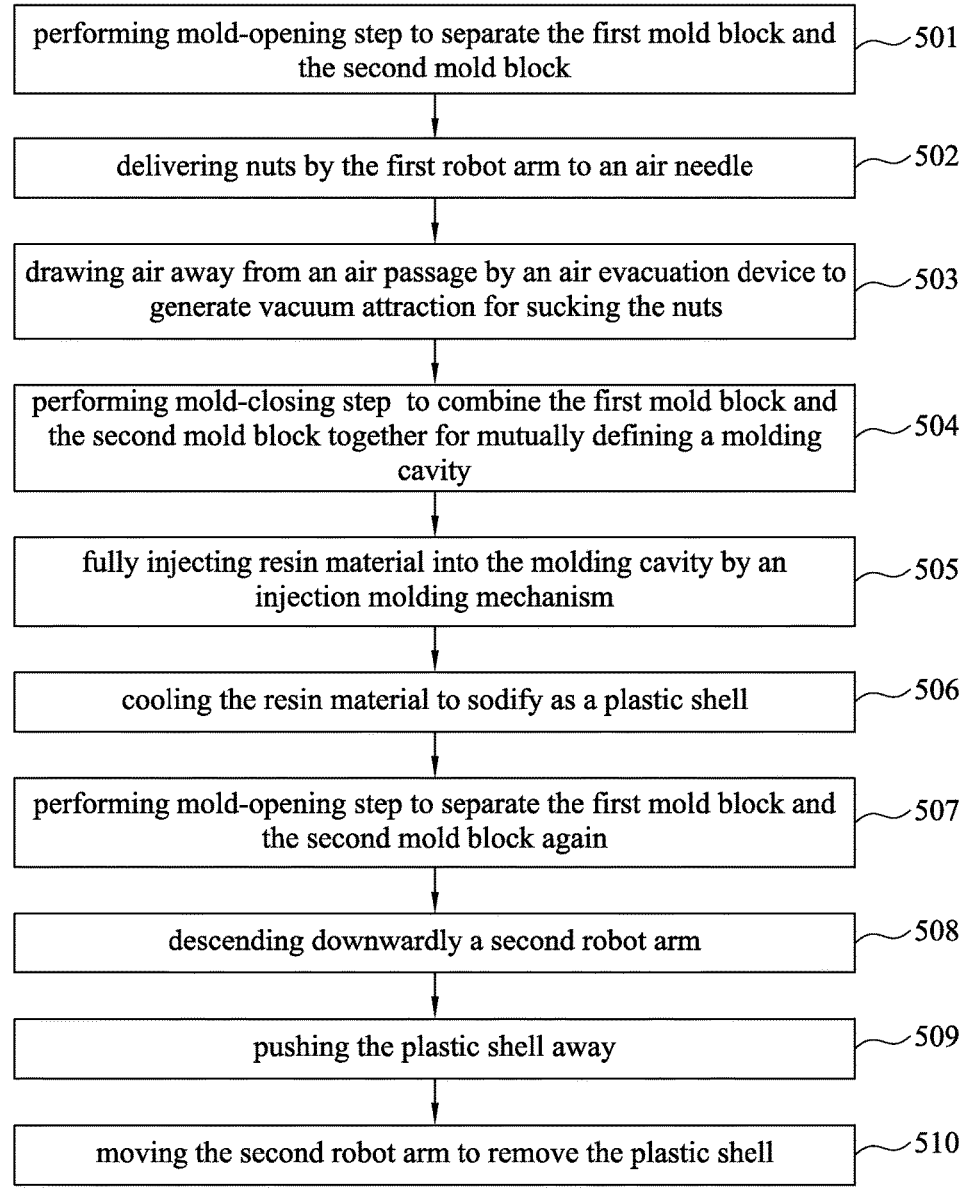
FIG. 5 is a flow chart of a method of automatic nut-inserted injection molding according to another embodiment of this disclosure.
Figure 6:
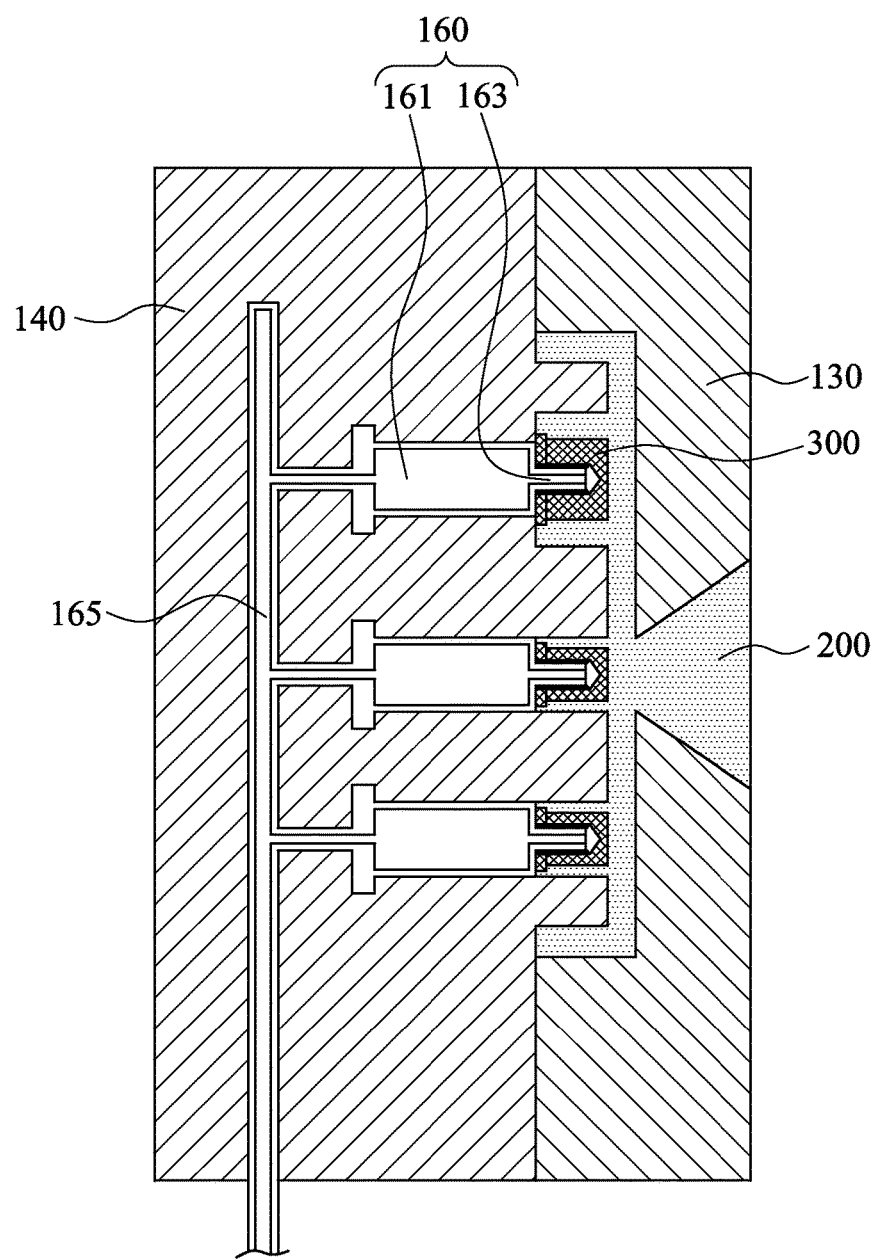
FIG. 6 is a schematic view of step 505 of FIG. 5.
Figure 7:
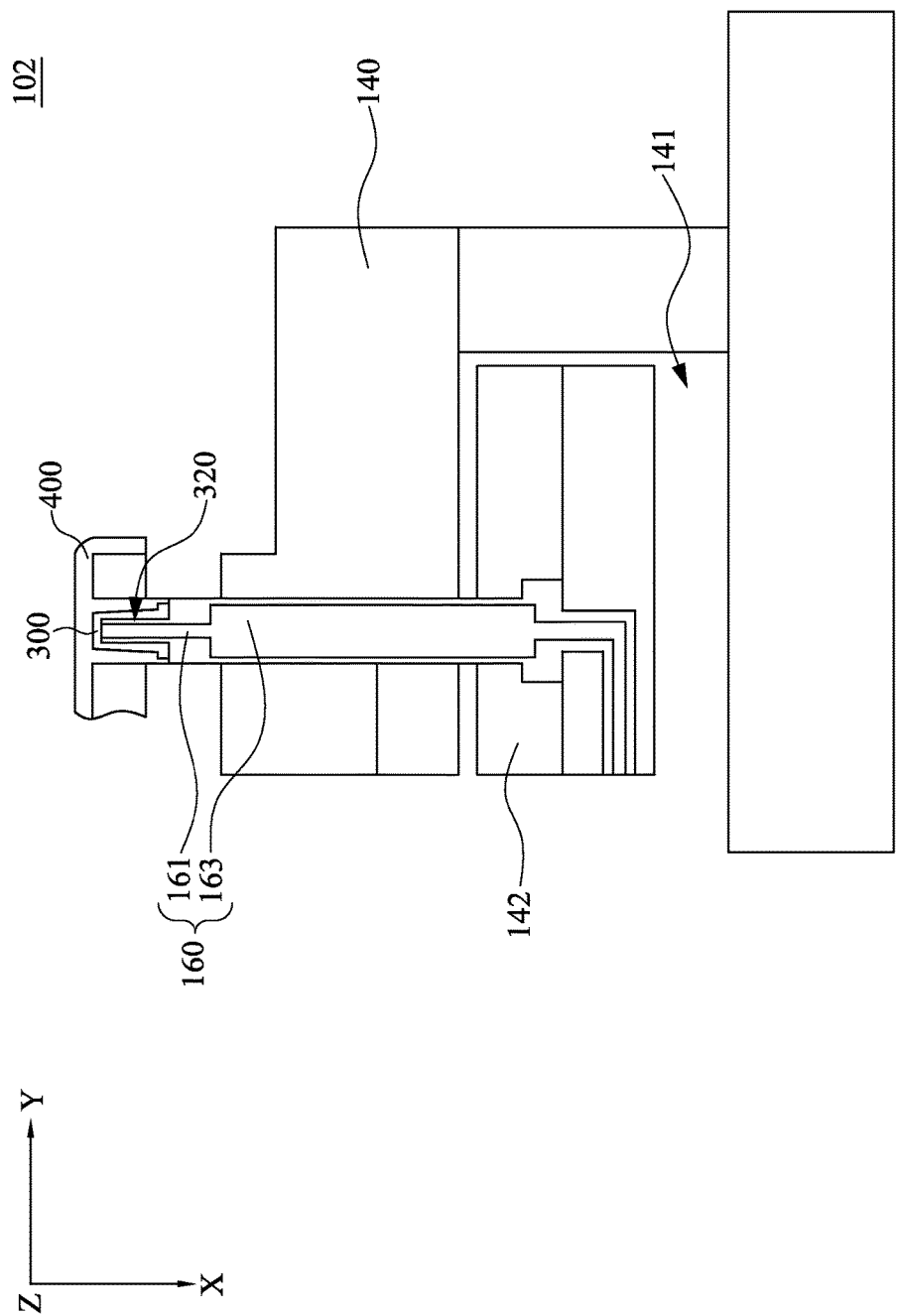
FIG. 7 is a partial schematic view of an air needle of the automatic nut-inserted injection molding system according to another embodiment of this disclosure.

Reference is now made to FIG. 5 to FIG. 6 in which FIG. 5 is a flow chart of a method of automatic nut-inserted injection molding according to another embodiment of this disclosure, FIG. 6 is a schematic view of step 505 of FIG. 5. In this embodiment, as shown in FIG. 5, the method of automatic nut-inserted injection molding which is coordinated to the automatic nut-inserted injection molding system 100 of FIG. 1 includes step 501 to step 510 as outlining below. In step 501, the mold-opening step is performed to separate the first mold block 130 and the second mold block 140 (FIG. 2). In step 502, after the automatic feeding machine 191A feeds the nuts 300, each of the nuts 300 is delivered by the first robot arm 191 to the air needle 160 so that the air needle 160 inserts into the enclosed nut bore 320 of the nut 300 (FIG. 2 and FIG. 3). In step 503, as the nut 300 is placed on the needle valve 163, the enclosed nut bore 320, the air needle 160 and the air passage 165 mutually form an enclosed space together. The air evacuation device 120 draws air away from the enclosed nut bore 320, the air needles 160 and the air passage 165, thus, when the air passage 165 is almost in a vacuum state, since the atmospheric pressure in the air passage 165 is less than atmospheric pressure out of the air passage 165, when vacuum attraction is generated in the enclosed nut bore 320, the nut 300 is tightly sucked on the surface of the second mold block 140. In step 504, the mold-closing step is performed to combine the first mold block and the second mold block together for mutually defining the aforementioned molding cavity 150 so as to enable the enclosed nut bore 320 to be hermetically isolated from the molding cavity 150. In step 505, the injection molding mechanism 110 is activated to fully inject resin material 200 into the molding cavity 150 so that the resin material 200 covers surfaces of all of the nuts 300 exposed towards the molding cavity 150 (FIG. 6). In step 506, the resin material 200 formed in the molding cavity 150 is cooled to solidify as a plastic shell 400 with the nuts 300 embedded therein (FIG. 7). In step 507, the mold-opening step is performed again to separate the first mold block 130 and the second mold block 140 (FIG. 2). In step 508, the second robot arm 190 is descended downwardly. In step 509, the plastic shell 400 is pushed away from second mold block 140 by the mold-clamping mechanism 170 (refer to FIG. 7). In step 510, the second robot arm 190 is moved again to remove the plastic shell 400 so as to mainly finish the method of automatic nut-inserted injection molding.

Furthermore, in the step 502 described above, the first robot arm 191 repeatedly reaches into a gap between the first mold block 130 and the second mold block 140 so as to deliver the nut 300 to the air needle 160 so that each of the air needle 160 inserts into the enclosed nut bore 320 of each of the nuts 300 (FIG. 2 and FIG. 3). At the moment, since the air evacuation device 120 is not activated yet, the nuts 300 still are not tightly sucked on the end surface 161F of the pipe body 161 yet. In the step 503 described above, the air evacuation device 120 draws air away from the enclosed nut bore 320, the air needles 160 and the air passage 165, the enclosed nut bore 320 of the nut 300 is tightly sucked (FIG. 3).

FIG. 7 is a partial schematic view of an air needle 160 of the automatic nut-inserted injection molding system 102 according to another embodiment of this disclosure. As shown in FIG. 7, in this embodiment, the second mold block 140 further has an ejection board 142. The ejection board 142 is telescopically disposed in an inner space 141 of the second mold block 140. One part of the air needle 160 is fixed on the ejection board 142, the other part of the air needle 160 penetrates through and outwards the surface of the second mold block 140 from the ejection board 142. Thus, with the movement of the ejection board 142 in the X-axis direction, the air needle 160 is simultaneously moved along with the ejection board 142 to extend more length of the air needle 160 outwards from the surface of the second mold block 140 facing the first mold block 130 so as to push the nut 300 of the plastic shell 400 for pushing the plastic shell 400 away from the surface of the second mold block 140 and separating the plastic shell 400 and the second mold block 140.

Therefore, the step 509 described above further includes a step of pushing the plastic shell 400 by pushing the air needle 160 to separate the plastic shell 400 and the second mold block 140. Also, after the plastic shell 400 is pushed away from second mold block 140 in the aforementioned step 509, the second robot arm 190 is then moved again to reach into the gap between the second mold block 140 and the first mold block 130 for removing away the plastic shell 400 embedded with nut 300 therein (FIG. 1).

Thus, by using the method of automatic nut-inserted injection molding of the disclosure, the process of automatic nut-inserted injection molding can be made automatically in which the nuts can be automatically moved and positioned into the mold blocks so as to easily proceed from the material-injection step to the product-ejection step so that the whole process thereof and automated production can be reduced and simplified, and the traditional step of thermally pressing the heated nuts into the plastic shell can be omitted so as to decrease manufacturing cost.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An automatic nut-inserted injection molding system comprising:
   an automatic feeding machine configured to feed at least one nut having an enclosed nut bore thereon;
   a robot arm configured to deliver the nut from the automatic feeding machine;
   an air evacuation device; and
   an injection-molding module comprising:
      a first mold block;
      a second mold block detachably closed with the first mold block for mutually defining a molding cavity;
      an air needle embedded in the second mold block with one part of the air needle, and exposed outwards from a surface of the second mold block with the other part of the air needle, the air needle comprising a pipe body, and a needle valve being communicated with the pipe body; and
      at least one air passage formed in the second mold block, and respectively connected to the air needle and the air evacuation device, wherein, when the robot arm moves the nut onto the air needle so that the air needle inserts into the enclosed nut bore, and the air evacuation device draws air away from the air passage, the enclosed nut bore is tightly sucked on the air needle to be hermetically isolated from the molding cavity, the pipe body has two opposite ends thereof, one of the two opposite ends of the pipe body is communicated with the air passage in the second mold block, and an end surface of the other of the two opposite ends of the pipe body is exposed outwards from the surface of the second mold block, and the needle valve is connected to the end surface of the other of the two opposite ends of the pipe body, communicated with the pipe body, and configured to insert into the enclosed nut bore, and the air evacuation device draws air to tightly suck the enclosed nut bore by the needle valve.

2. The automatic nut-inserted injection molding system of claim 1, wherein
an internal diameter of the pipe body is greater than an internal diameter of the needle valve.

3. The automatic nut-inserted injection molding system of claim 1, wherein
the pipe body is a single-caliber pipe body having two opposite ends thereof, one end of the single-caliber pipe body being communicated with the air passage in the second mold block, and the other end of the single-caliber pipe body projecting outwards from the surface of the second mold block being as the needle valve for inserting into the enclosed nut bore.

4. The automatic nut-inserted injection molding system of claim 1, wherein the first mold block and the second mold block are closed together in a mold-closed axis, and the mold-closed axis is parallel to or intersected with a major axis of the air needle.

5. The automatic nut-inserted injection molding system of claim 1, wherein the injection-molding module comprises:
an injection molding mechanism configured to inject resin material into the molding cavity through a runner, wherein the runner is in the first mold block or the second mold block.

6. The automatic nut-inserted injection molding system of claim 1, wherein the air needle is telescopically disposed on the second mold block, and configured to push a plastic shell away from the surface of the second mold block and separate the plastic shell and the second mold block.

* * * * *